United States Patent [19]

Criss et al.

[11] 3,986,884

[45] Oct. 19, 1976

[54] REFRACTORY MORTAR COMPOSITION

[75] Inventors: George Hugh Criss, Bethel Park; Ernest Paul Weaver, Pittsburgh, both of Pa.

[73] Assignee: Dresser Industries, Inc., Dallas, Tex.

[22] Filed: Dec. 17, 1975

[21] Appl. No.: 641,720

Related U.S. Application Data

[63] Continuation-in-part of Ser. No. 554,822, March 3, 1975, abandoned.

[52] U.S. Cl. .................................... 106/66; 106/69; 106/73.4; 106/209
[51] Int. Cl.$^2$ .................... C04B 35/10; C04B 35/12
[58] Field of Search ................ 106/66, 73.4; 264/63

[56] References Cited
UNITED STATES PATENTS

| | | | |
|---|---|---|---|
| 3,192,058 | 6/1965 | Davies | 106/66 X |
| 3,364,040 | 1/1968 | Criss | 106/38.23 |
| 3,770,867 | 11/1973 | Criss | 106/69 X |
| 3,847,629 | 11/1974 | Hill | 106/66 X |
| 3,862,845 | 1/1975 | Manigault | 106/66 X |
| 3,888,687 | 6/1975 | Manigault | 106/66 |

FOREIGN PATENTS OR APPLICATIONS

| | | | |
|---|---|---|---|
| 996,297 | 6/1965 | United Kingdom | 106/66 |

*Primary Examiner*—Helen M. McCarthy
*Attorney, Agent, or Firm*—R. T. Majesko; J. N. Hazelwood

[57] ABSTRACT

A refractory composition suitable for use as a mortar which consists of chromic oxide and high alumina refractory material and a bonding material consisting of anhydroglucose polymer and phosphoric acid, the composition being substantially free of $SiO_2$.

6 Claims, No Drawings

REFRACTORY MORTAR COMPOSITION

This application is a continuation-in-part of Application Ser. No. 554,822 filed Mar. 3, 1975, now abandoned.

The requirements which a bonding mortar must meet in service are frequently extremely exacting and demand a carefully adjusted balance of properties. For economy and convenience, a mortar should have good working properties when mixed to either putty-like or cream-like consistency. With excellent workability and water retention over a range of consistencies, a mortar can be used for dipped or troweled joints. The mortar should not shrink excessively upon drying or heating and should have a good working time and have both cold and hot bonding properties. The thermal expansion of the mortar should be substantially the same as that of the brick with which it is used or temperature variations will effect the bond between brick and mortar causing surface cracking and peeling. The refractoriness must be high enough that the mortar will not melt or flow from joints under furnace operating conditions.

Refractory mortars may be divided into two general classes; namely, heat setting bonding mortars and air setting bonding mortars. The distinguishing feature of a heat setting bonding mortar is that it requires relatively high temperatures for the development of an adequate bond, commonly called the ceramic bond. The bond generally begins to develop between 2000° F. and 2500° F., depending upon its composition. For many purposes, heat setting bonding mortars do not meet the needs of modern furnace practice. At moderate temperatures, a heat setting bonding mortar does not meet the needs of brick, although the flexibility of such a structure is sometimes valued.

Air setting mortars take a relatively strong set upon drying, have a firm bond at elevated temperatures, and form mechanically strong joints with high resistance to abrasion and erosion. Bonding mortars of the air setting type are now used for laying many types of standard refractory brick, especially in those portions of a furnace where the operating conditions are most severe. Air setting mortars are recommended for service where a strong bond is desired over a wide range of temperatures. Chemical binders are used to impart air setting properties and to maintain the strength of the bond up to the temperature at which a ceramic bond takes effect.

More common air setting mortars are bonded with an alkaline silicate. These mortars are strong and exhibit excellent workability. However, it has been found that the alkaline silicate bonds react quite rapidly with some molten metals, resulting in deep joint penetration. Commercial experience has shown the penetration to be deeper than through the refractory brick joined by the mortar. Similar experience has been had with other prior art mortars. Silicates have also been found present in mortar compositions through the addition of a clay material which has been considered necessary for troweling purposes.

In accordance with the present invention, there is provided a refractory mortar composition which is substantially free of $SiO_2$. The mortar includes about 15% to 25%, by weight, chromic oxide and the balance high alumina refractory material. The composition contains in addition, as bonding materials, about 5 to 12% anhydroglucose polymer and phosphoric acid in an amount to provide $P_2O_5$ equivalent to that provided by about 7 to 15% of 85% phosphoric acid, both based on the total weight of the alumina and chromic oxide.

In a preferred embodiment, the chromic oxide is present in amounts of about 20 to 25%, balance high alumina material; the phosphoric acid is present in amounts of about 9 to 11%; and the anhydroglucose polymer is present in amounts of about 7.5 to 10%. Also, it is preferred that the high alumina material be composed of at least two different types. The first type is a material containing reactive alumina, i.e. calcined alumina, and range typically from about 30 to 40% of the composition. The second type consists of a non-reactive alumina material, i.e. tabular alumina.

The preferred chromic oxide material for use in the present invention is a very finely divided powder. The separate and discrete particles of the material average about 1 micron or less in diameter and are uniform in this size range. It crystallizes in the hexagonal system similar to the hematite structure. Physical form is indicated by electron microscope and crystallinity confirmed by the existence of a definite X-ray defraction pattern. Such $Cr_2O_3$ material is water-insoluble. Widely accepted specifications for such $Cr_2O_3$ are: purity minimum 97%, water-soluble impurities maximum 0.5%, volatile impurities maximum 0.5%. Specific gravity is about 5.1 to 5.2.

Anhydroglucose is a term applied to the unit of molecular structure of cellulose -OCHCHOHCHO-CHOHCHCH$_2$OH and differing from the composition of glucose of abstraction of the elements of water. The term is also applied to material of essentially the same composition resulting from oxidation of cellulose by agents such as nitrogen dioxide. The polymer structure is substantially a linear chain of anhydroglucose units linked beta 1–3. Thirty to thirty five percent of the linear chain units bear single appended anhydroglucose units linked beta 1–6. The material is sold under the trademark POLYTRAN L by the Pillsbury Company and has a molecular weight between about 75,000 and 125,000. At 10% concentration in aqueous solution it has a viscosity of from about 500 to 1000 centipoises between 10° and 90° C.

Phosphoric acid of any concentration available, that can be handled, may be employed in the present invention as long as the stated range, based on $P_2O_5$ content, is not exceeded. For 85% concentration phosphoric acid used in the range of 7 to 15%, the $P_2O_5$ ranges from about 4 to 9%, since this phosphoric acid analyzes about 62% $P_2O_5$. Phosphoric acid of 75% concentration contains about 55% $P_2O_5$, 105% concentration contains about 76% $P_2O_5$, and 115% concentration contains about 83% $P_2O_5$.

Merely by way of example, a number of mixes were prepared and tested as shown in Table I.

TABLE I

| Mix: | A | B | C | D | E | F | G | H | I | J |
|---|---|---|---|---|---|---|---|---|---|---|
| Tabular Alumina | 48% | 48% | 45% | 48% | 48% | 45% | 48% | 48% | 45% | 48% |
| Calcined Alumina | 37 | 32 | 30 | 37 | 32 | 30 | 37 | 32 | 30 | 32 |

TABLE I-continued

| Mix: | A | B | C | D | E | F | G | H | I | J |
|---|---|---|---|---|---|---|---|---|---|---|
| Chromic Oxide | 15 | 20 | 25 | 15 | 20 | 25 | 15 | 20 | 25 | 20 |
| Plus Additions: | | | | | | | | | | |
| Phosphoric Acid (85%) | | | | | 11% | | | | | 9% |
| Anhydroglucose Polymer | 5% | 5% | 5% | 7.5% | 7.5% | 7.5% | 10% | 10% | 10% | 7.5% |
| Water | 3.0 | 3.6 | 6.0 | 1.0 | 2.0 | 3.2 | 0 | 1.0 | 1.6 | 5.5 |
| Water retention test-time during which mortar retains enough water to maintain a shiny surface on a silica brick (seconds): | | | | | | 300 | | | | |
| Spreading test-time during which mortar may be easily worked on a silica brick (seconds): | | | | | | 300 | | | | |
| Rate of Settle, % water added to bring to dipping consistency | 14.5% | 17.0% | 22% | 14% | 15% | 18% | 14.5% | 16.5% | 16.5% | |
| % Settle after 1 hour | | Trace | | 0 | Trace | Trace | 0 | 0 | 0 | |
| % Settle after 24 hours | 5 ml | 6 ml | 9 ml | 2 ml | 3 ml | 6 ml | 1 ml | 2 ml | 3 ml | |
| Modulus of Rupture, after heating to 500° F, psi (Av 3): | 1400 | 1320 | 870 | 1380 | 1070 | 850 | 1840 | 1110 | 810 | 360 |
| Modulus of Rupture, after 1700° F. Reheat (psi) (Av 3) | 830 | 80 | 320 | 220 | 420 | 210 | 180 | 50 | 50 | 130 |

One of unique features of the mortar shown above is the use of anhydroglucose polymer in place of the usual ball clay or bentonite plasticizers added to give workability. The use of these plasticizers in a high purity alumina-chrome system is undesirable due to the silica content of the clays.

Results of testing the above compositions show that as the anhydroglucose polymer content increased from 5 to 10%, the workability improved and the rate of settling was significantly reduced. Vicat data suggested that a practical upper limit for the anhydroglucose would be about 12% since only minor additions of water could be made to the mixes containing 10% anhydroglucose. No significant change in slag resistance or strength of the mortar resulted as the anhydroglucose increased from 5 to 10% in the mixes. The mixes containing 20 and 25% chromic oxide were found to have outstanding slag resistance. Drip slag tests on mortar joints between high quality high alumina brick at 2700° F, showed that the mortar joints containing 20 and 25% chromic oxide were relatively unaffected by slag erosion, while the brick around the joints were badly eroded. Mixes made with 25% chromic oxide have slightly lower strength compared to mixes made with lower chromic oxide contents. However, in order to maintain the grind as the fine chromic oxide increased in each of the series, the fine reactive calcined alumina was decreased and this may have effected strengths at the higher chromic oxide contents. In addition, the refractoriness of the mixes increased with the increasing chromic oxide content. The mixes in Table I were sized such that about 20% was retained on a +65 mesh Tyler Screen while the balance was −65 mesh.

The typical chemical analyses of the high alumina materials preferred in this invention are given in Table II below.

TABLE II

| | Tabular Alumina | Calcined Alumina |
|---|---|---|
| $SiO_2$ | 0.08% | 0.02% |
| $Al_2O_3$ | 99.5 | 99.2 |
| $TiO_2$ | Trace | Trace |
| $Fe_2O_3$ | 0.06 | 0.05 |
| CaO | Trace | Trace |
| MgO | Trace | Trace |
| $Na_2O$ | 0.02 | 0.47 |
| $K_2O$ | Trace | 0.01 |
| $Li_2O$ | Trace | 0.02 |
| Loss | | 0.2 |

Having thus described the invention in detail and with sufficient particularity as to enable those skilled in the art to practice it, what is desired to have protected by Letters Patent is set forth in the following claims.

The embodiments of the invention in which an exclusive property or privilege is claimed are defined as follows:

1. A refractory motar composition substantially free of $SiO_2$ consisting essentially of about 15% to about 25%, by weight, water-insoluble, high purity, finely-divided particles of uniform, average diameter of 1 micron or less chromic oxide, the balance high purity alumina refractory material, the composition containing in addition about 5 to 12% anhydroglucose polymer and phosphoric acid in an amount to provide $P_2O_5$ equivalent to that provided by about 7 to 15% of 85% phosphoric acid, both based on the total weight of the alumina and chromic oxide.

2. The composition of claim 1, in which the chromic oxide is present in amounts of about 20 to 25%, by weight.

3. The composition of claim 1, in which the composition is composed of about 30 to 40%, by weight, alumina material containing reactive alumina.

4. The composition of claim 3, in which the reactive alumina material is calcined alumina.

5. The composition of claim 1, in which the phosphoric acid is present in amounts of about 9 to 11%.

6. The composition of claim 1, in which the anhydroglucose polymer is present in amounts of about 7.5 to 10%.

* * * * *